Feb. 28, 1928.  
O. D. TREIBER  
FRICTION CLUTCH  
Original Filed June 29, 1925
1,660,497
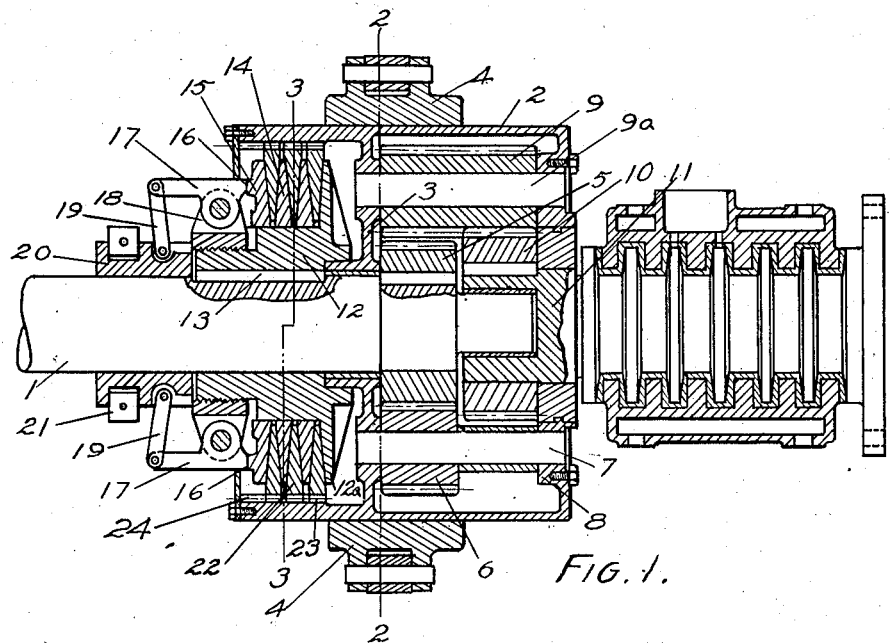
FIG.1.
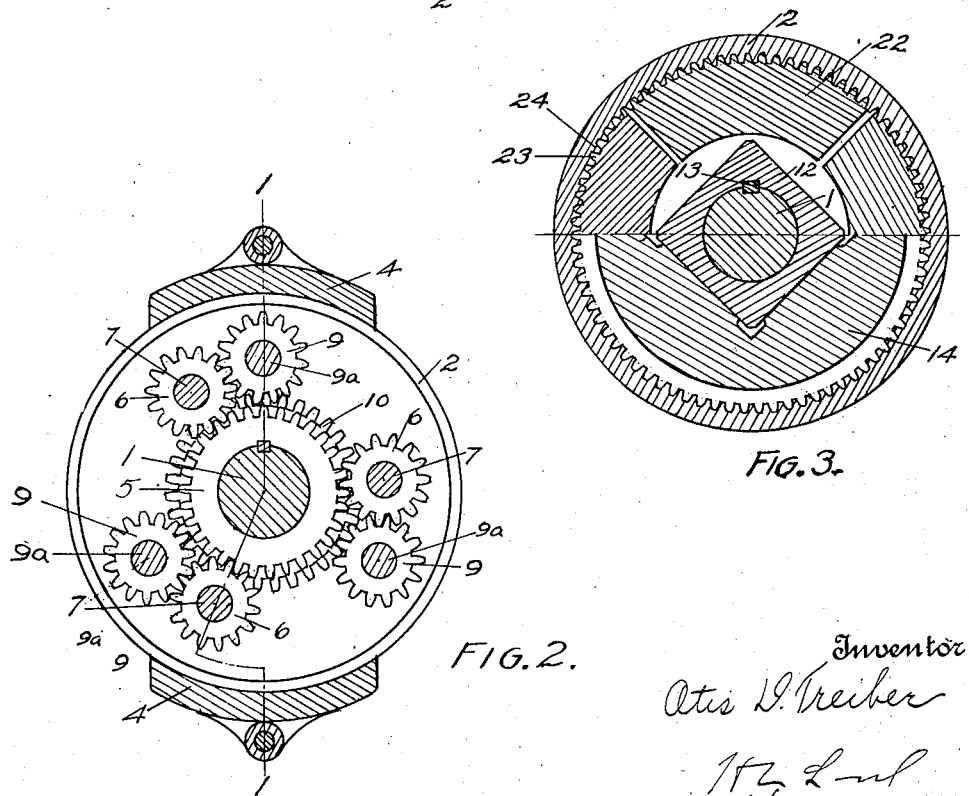
FIG.2.
FIG.3.
Inventor
Otis D. Treiber
Attorney Patented Feb. 28, 1928.

1,660,497

UNITED STATES PATENT OFFICE.

OTIS D. TREIBER, OF GROVE CITY, PENNSYLVANIA, ASSIGNOR TO THE BESSEMER GAS ENGINE COMPANY, OF GROVE CITY, PENNSYLVANIA, A CORPORATION OF PENNSYLVANIA.

FRICTION CLUTCH.

Application filed June 29, 1925, Serial No. 40,149. Renewed July 13, 1927.

With friction disc clutches as heretofore made difficulty has been experienced in the mounting of the inwardly extending discs in the shell or casing carrying such discs. One of the objectionable features of such a mounting has been the tendency to rattle due to the slack or lost motion through the locking means between the disc and the shell or casing. The present invention is designed to correct this difficulty. Features and details of the invention will appear from the specification and claims.

The invention is illustrated in the accompanying drawings as follows:—

Fig. 1 shows a central section through the clutch.

Fig. 2 a section on the line 2—2 in Fig. 1.

Fig. 3 a section on the line 3—3 in Fig. 1.

1 marks what may be termed the driving shaft although either shaft may be the driving or driven shaft. A clutch shell 2 is carried by a web 3 which is journaled on the shaft 1. Brake shoes 4 are provided in the usual manner for the shell 2. A gear 5 is fixed on the shaft 1 and meshes with gears 6. The gears are journaled on pins 7 extending from the web 3 to an inwardly extending flange 8 on the shell. The gears 6 mesh with gears 9. The gears 9 are mounted on pins 9ª between the web 3 and flange 8. The gears 9 mesh with gears 10 on the driven shaft 11. This forms a common form of reversing gearing.

A disc mounting 12, rectangular in shape, is keyed by a key 13 on the shaft 1. It has a flange 12ª at its inner end and discs 14 slidingly mounted thereon, also the operating plate 15 which forms a friction surface. The operating plate 15 and the discs 14 have rectangular openings through them which, fitting on the rectangular carrier 12, lock the plate and discs against rotation on the mounting. The plate 15 has a surface 16 which is engaged by a lever 17. The lever 17 is mounted on ears 18 extending from the mounting 12. The lever 17 is actuated by a thrust link 19 carried by the sliding block 20 and the sliding block 20 is operated by a ring 21.

Inwardly extending discs 22 are mounted within the shell 2. They are provided with teeth 23 similar to gear teeth which interlock with teeth 24 on the inner surface of the shell 2. The discs 22 are arranged between the flange 12ª, plate 15 and discs 14 and these plates and discs alternate, the surfaces of the outwardly and inwardly extending series of discs being oppositely bevelled. The discs 22 are also split ordinarily into four parts so that they can readily expand.

In the operation of the device, the shell due to its rotation drives the discs 22 and these discs through the influence of centrifugal force are thus forced outwardly into close and intimate engagement with the shell and this prevents the rattling which has been a source of annoyance and difficulty with devices of this type. When the discs are set the opposing tapers also tend to force the discs 22 outwardly, thus making the engagement with the shell pronounced so as to prevent any slack or rattling in the interlocking parts between the discs and the shell.

What I claim as new is:—

1. In a friction clutch, the combination of an outwardly extending tapered friction plate; an inwardly extending split friction plate; a shell in which the inwardly extending plate is mounted; means locking the inwardly extending plate with the shell; a mounting for the outwardly extending plate; and mechanism for setting and releasing the plates.

2. In a friction clutch, the combination of a series of outwardly extending tapered friction plates; a series of inwardly extending split friction plates; a shell in which the inwardly extending series of plates are mounted; means for locking the inwardly extending series of plates with the shell; a mounting for the outwardly extending series of plates; and mechanism for setting and releasing the plates.

3. In a friction clutch, the combination of an outwardly extending tapered friction plate; an inwardly extending split friction plate; a shell in which the inwardly extending plate is mounted; means locking the inwardly extending plate with the shell, comprising interlocking teeth on the plate and shell; a mounting for the outwardly extending plate; and mechanism for setting and releasing the plates.

4. In a friction clutch, the combination of an outwardly extending tapered friction plate; an inwardly extending split tapered friction plate; a shell in which the inwardly extending friction plate is mounted; means locking the inwardly extending friction plate with the shell; a mounting for the outwardly extending friction plate; and mechanism for setting and releasing the plates.

5. In a friction clutch, the combination of a series of outwardly extending tapered friction plates; a series of inwardly extending split tapered friction plates; a shell in which the inwardly extending series of plates is mounted; means locking the inwardly extending series of friction plates with the shell; a mounting for the outwardly extending series of plates; and mechanism for setting and releasing the plates.

In testimony whereof I have hereunto set my hand.

OTIS D. TREIBER.